United States Patent [19]

Tuerk

[11] Patent Number: 4,740,029
[45] Date of Patent: Apr. 26, 1988

[54] BOW-TYPE TARP COVERING AND TENSIONING MEANS

[76] Inventor: Robert P. Tuerk, 415 Sugar Tree La., Indianapolis, Ind. 46260

[21] Appl. No.: 936,718

[22] Filed: Nov. 25, 1986

[51] Int. Cl.$^4$ .............................................. B60P 7/02
[52] U.S. Cl. ..................................... 296/100; 296/101
[58] Field of Search .......................... 296/98, 100, 101

[56] References Cited

U.S. PATENT DOCUMENTS

| | | |
|---|---|---|
| 759,628 | 5/1904 | Nicolai . |
| 1,827,059 | 10/1931 | Woolcott . |
| 3,041,104 | 6/1962 | Richard . |
| 3,310,338 | 3/1967 | Greenberg . |
| 3,416,834 | 12/1968 | Morse . |
| 3,488,087 | 1/1970 | Cox . |
| 3,498,666 | 3/1970 | Harrawood . |
| 3,756,650 | 9/1973 | Michel . |
| 3,759,568 | 9/1973 | Unruh . |
| 3,806,185 | 4/1974 | Brandjord ........................... 296/98 |
| 3,820,840 | 6/1974 | Forsberg . |
| 3,841,697 | 10/1974 | McFarland . |
| 3,868,142 | 2/1975 | Bachand et al. . |
| 3,942,830 | 3/1976 | Woodard . |
| 3,964,781 | 6/1976 | Fenton . |
| 3,986,749 | 10/1976 | Hull et al. . |
| 4,023,857 | 5/1977 | Killion . |
| 4,032,186 | 6/1977 | Pickering et al. . |
| 4,046,416 | 9/1977 | Penner . |
| 4,067,603 | 1/1978 | Fenton . |
| 4,129,331 | 12/1978 | Lawson . |
| 4,157,202 | 6/1979 | Bachand . |
| 4,189,178 | 2/1980 | Cramaro . |
| 4,281,872 | 8/1981 | Biancale . |
| 4,516,802 | 5/1985 | Compton . |

FOREIGN PATENT DOCUMENTS

| | | |
|---|---|---|
| 530693 | 7/1931 | Fed. Rep. of Germany . |
| 2259721 | 10/1975 | France . |
| 0182537 | 11/1982 | Japan ................... 296/100 |
| 58-4628 | 1/1983 | Japan . |
| 942081 | 11/1963 | United Kingdom . |
| 2074511 | 11/1981 | United Kingdom . |

Primary Examiner—Robert B. Reeves
Assistant Examiner—Russell D. Stormer
Attorney, Agent, or Firm—Laubscher & Laubscher

[57] ABSTRACT

A tarp cover system is disclosed for an open-topped truck or trailer container, including a tarp cover member adapted to overlie the container to close the chamber therein, the front end portion of the cover member being fastened with the external surface of the container front wall. The rear end portion of the cover is fastened to the transverse portion of a generally U-shaped normally-vertically-oriented inverted bow member that extends transversely above the container and includes downwardly directed leg portions that extend downwardly for pivotal connection with a longitudinally displaceable carrier arrangement, whereby the bow member is displaceable in opposite directions longitudinally of the container to cover and uncover the container chamber, respectively. When the bow member is in the rear container-uncovering position, it may be pivoted rearwardly and downwardly about the lower ends of its leg portions toward a generally horizontal cover-tensioning position in which it is secured by tie lines. When the bow member is in its forward container-covering position, it may be pivoted forwardly and downwardly toward a container-unobstructing retracted position.

8 Claims, 3 Drawing Sheets

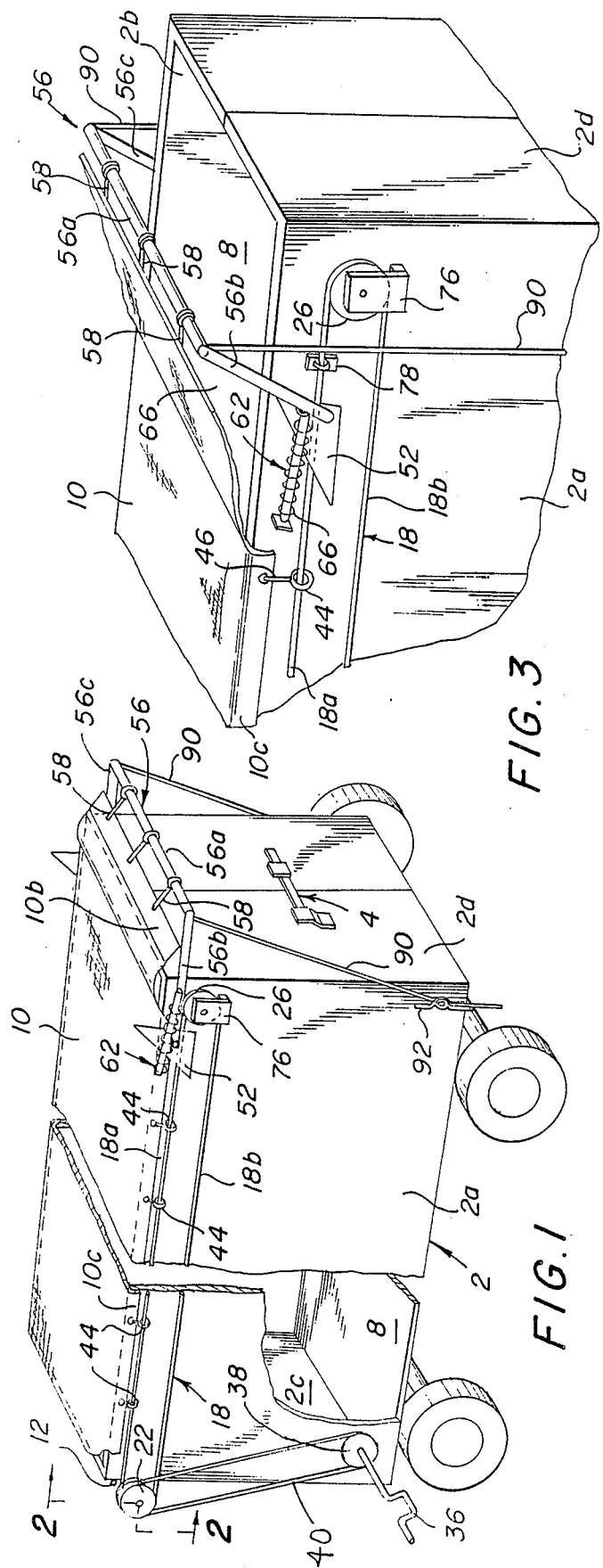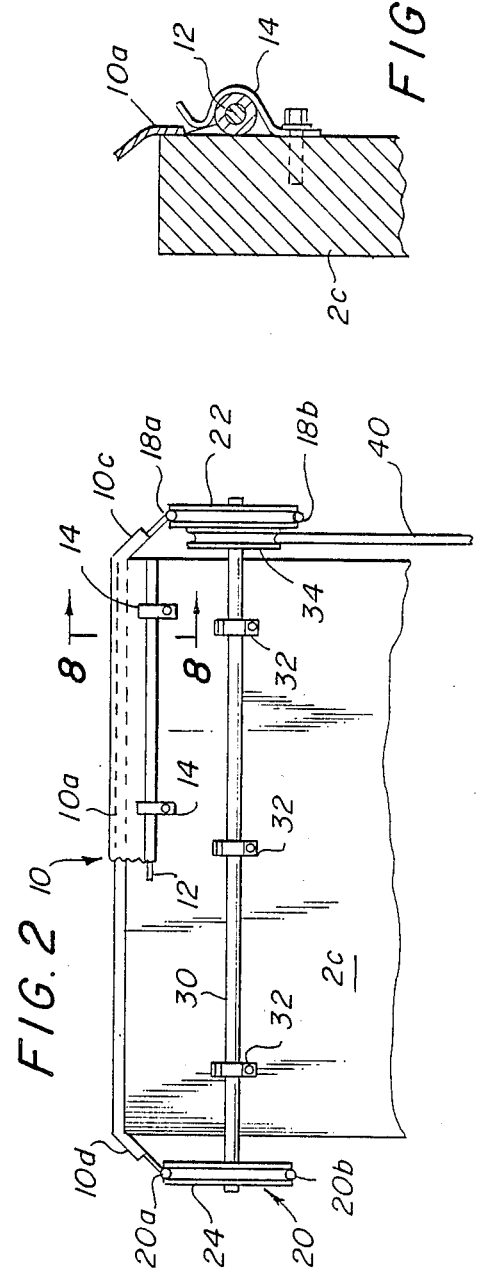

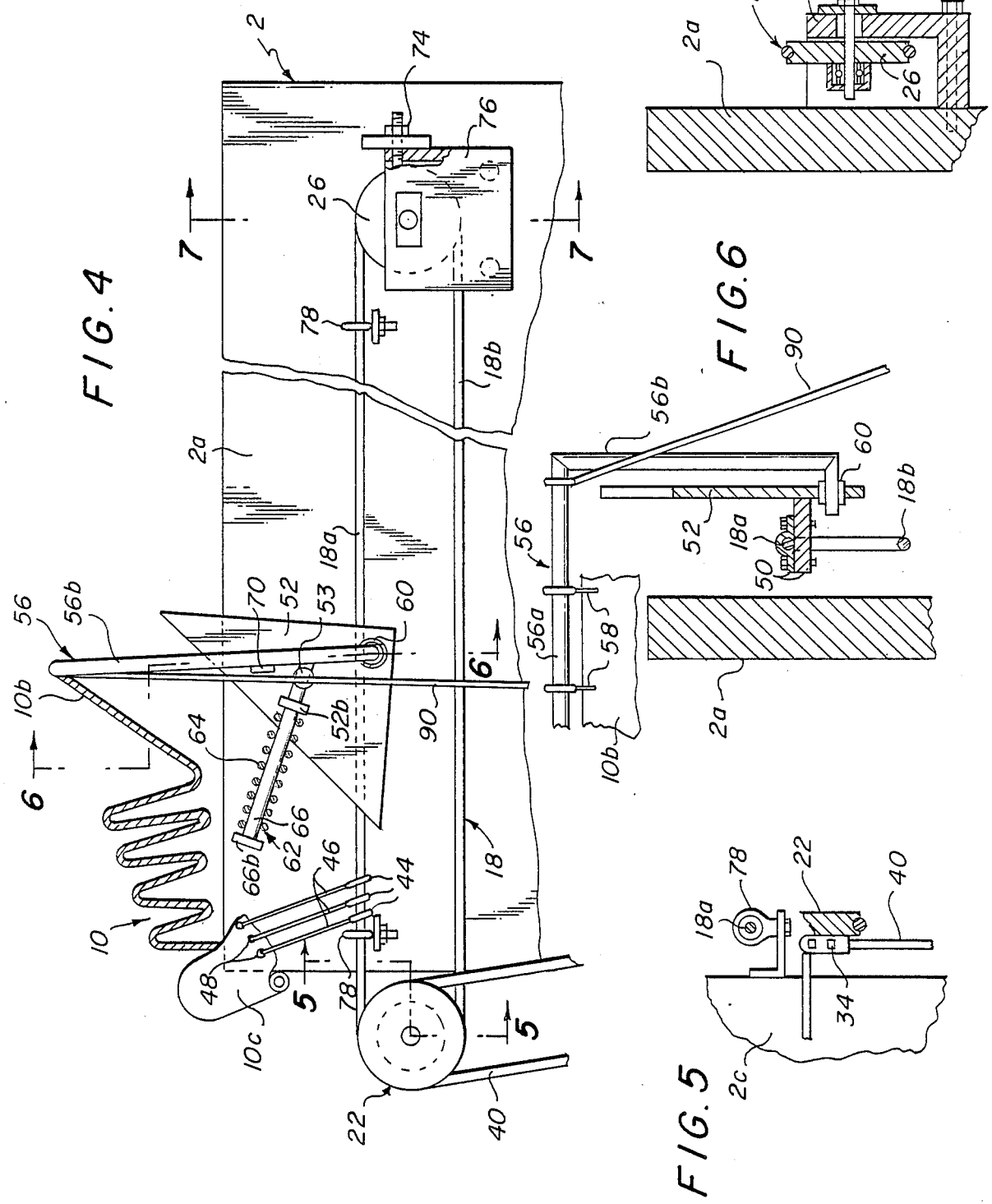

BOW-TYPE TARP COVERING AND TENSIONING MEANS

BRIEF DESCRIPTION OF THE PRIOR ART

Tarpaulin cover systems for open-topped truck or trailer box-type containers are well known in the patented prior art, as evidenced, for example, by the prior patents to Nicolai U.S. Pat. No. 759,628, Woolcott U.S. Pat. No. 1,827,059, Richard U.S. Pat. No. 3,041,104, Harrawood U.S. Pat. No. 3,498,666, Killion U.S. Pat. No. 4,023,857 and Cramaro U.S. Pat. No. 4,189,178, for example. In the aforementioned Woolcott patent, guide tracks are provided externally of the side walls of the container to cause an end bow to swing down through an arc to completely cover the open rear end of the truck body. In Killion, the extensible end of the cover is initially displaced upwardly, thereafter moved longitudinally of the road bed with the aid of guide tracks, and finally downwardly as the free end of the tarpaulin moves into position immediately adjacent the end of the load bed remote from the winding member. In Harrawood, a swinging frame is adapted to be pivoted downwardly over the rear gate of the dump body. In this position, the weight of the swinging frame itself tends to hold the cover over the load.

These known tarp covering systems are generally rather costly to manufacture and install, and it has proven difficult for a single operator to cover and uncover the vehicle container in a quick positively-fastened manner, and to obtain the appropriate tensioning of the cover member.

The present invention was developed to avoid the above and other drawbacks of the known tarp covering systems, and to provide a simple, relatively-inexpensive covering system in which the use of guide tracks and the like are avoided.

SUMMARY OF THE INVENTION

Accordingly, a primary object of the present invention is to provide a tarp covering system including a rectangular tarp cover member having longitudinal and transverse dimensions slightly greater than the corresponding dimensions of the container, respectively, means for connecting said cover member adjacent its front edge with the external surface of the front wall of the container, means for displacing the rear edge portion of the cover member longitudinally of the container between container-covered rear and container-uncovered front positions, respectively, and means operable when the cover is in the container-covered condition for longitudinally tensioning the cover.

According to a more specific object of the invention, the cover displacing means includes a generally U-shaped inverted transversely-arranged bow member having downwardly extending leg portions the lower extremities of which are pivotally connected with the upper runs of endless drive means mounted externally slightly below the upper edges of the container side walls respectively, the transverse portion of the bow member being connected with the rear edge portion of the cover member. The bow member is normally spring-biased toward the vertical position, means being provided for pivoting the bow member, when in the rear container-covered position, rearwardly and downwardly about the lower ends of the bow member leg portions toward a generally horizontal position, thereby to longitudinally tension the tarp cover member. According to a preferred embodiment of the invention, the bow member, when in the front container-uncovered position, may be pivoted forwardly toward a generally horizontal retracted position, whereby the container chamber is unobstructed.

In accordance with a further object of the invention, connecting rings are slidably mounted on the upper runs of the endless drive members, which connecting rings are connected with lateral edge portions of the cover member that extend downwardly beyond the upper edges of the container side walls. Stationary guide means on the container side walls guide the upper runs of the endless drive means.

BRIEF DESCRIPTION OF THE DRAWINGS

Other objects and advantages of the invention will become apparent from a study of the following specification when viewed in the light of the accompanying drawings, in which:

FIG. 1 is a perspective view of the truck or trailer container with the tarp cover in its fully-covered longitudinally-tensioned condition;

FIG. 2 is a detailed sectional view taken along line 2—2 of FIG. 1;

FIG. 3 is a detailed perspective view of the rear end of the container with the cover member in its untensioned, partially-uncovered condition;

FIG. 4 is a detailed side elevational view of the apparatus with the cover member in its untensioned, substantially fully-uncovered condition;

FIGS. 5-7 are detailed sectional views taken along lines 5—5, 6—6 and 7—7 of FIG. 4, respectively;

FIG. 8 is a detailed sectional view taken along line 8—8 of FIG. 2; and

DETAILED DESCRIPTION

Figure 10:
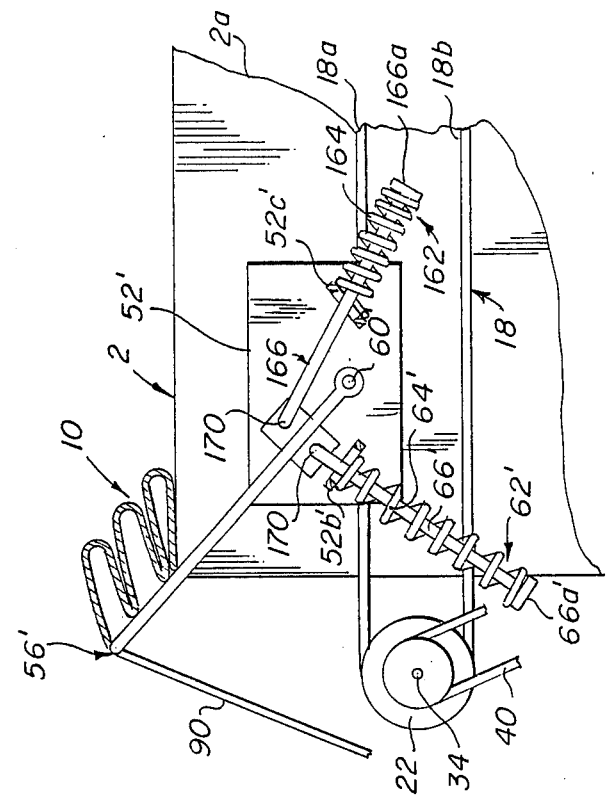
FIGS. 9 and 10 are detailed views of a preferred embodiment of the invention in which the bow member is in its vertical and forwardly pivoted retracted positions, respectively.

Referring first more particularly to FIG. 1, the trailer container 2, which is adapted to transport grain or similar particulate material, is of open-topped rectangular configuration including a pair of opposed parallel side walls 2a and 2b, and front and rear end walls 2c and 2d, respectively thereby defining an internal chamber 8. As is conventional, the rear wall includes a pair of hinged door members that are normally locked in the closed condition by lock means 4. Overlying the upper edges of the vertical container walls is a conventional flexible tarp cover member 10 of generally rectangular configuration, the longitudinal and transverse dimensions of the cover member being greater than the corresponding dimensions of the trailer 2. Consequently, at its forward transverse edge, the forward portion 10a of the cover member 10 extends beyond the container front wall 2c, and at its rear end, the rear edge portion 10b of the cover member 10 extends beyond the upper edge of the container rear wall 2d. Furthermore, the lateral edge portions 10c and 10d of the cover member extend downwardly adjacent the external surfaces of the container side walls 2a and 2b, respectively.

Referring now to FIGS. 2 and 8, the cover forward edge portion 10a is seamed to define a tubular sleeve for receiving the fastening and strengthening rod 12 that is clamped to the external surface of the container front wall 2c by a plurality of transversely spaced clamping plates 14.

In accordance with a characterizing feature of the invention, a pair of endless drive members 18 and 20 are mounted externally of the container side walls 2a and 2b, respectively, which endless members are provided with parallel vertically spaced upper and lower runs 18a, 20a and 18b, 20b, respectively. In the illustrated embodiment, the endless cables are mounted at one end on drive pulleys 22 and 24, and at the other end on driven pulleys 26 and 28, respectively. The drive pulleys 22 and 24 are connected with opposite ends of transverse drive shaft 30 that is journalled on the external surface of container front wall 2c by fixed bearing means 32, as shown in FIG. 2. The drive pulley 22 is integral with a pulley 34 that is driven by manually-operable crank handle 36 via drive pulley 38 rotatably connected with the container 2 by fixed journal means (not shown), and endless V-belt, cable or chain 40. Consequently, the endless drive members 18 and 20 are operable to be reversely driven manually in the same direction and at the same velocity by the crank means 36.

The upper runs 18a and 22a of the endless drive members are spaced slightly below the upper edges of the associated side walls 2a and 2b, respectively. The lateral edge portions 10c and 10d of the cover member 10 are connected with these upper runs by a plurality of connecting rings 44 that are slidably mounted on each of these upper runs, and flexible tie members 46, which are preferably elastic bands tied with loops 48 formed in the lateral edge portions of the cover member. Securely fastened by clamping plates 50 (FIG. 6) with the upper runs of each drive member are a pair of opposed carrier or support plates 52 that pivotally support the normally vertically arranged inverted U-shaped bow member 56. The bow member 56 includes a transverse portion 56a to which the rear edge portion 10b of the cover member 10 is connected by a plurality of resilient tie members 58, and a pair of downwardly extending leg portions 56b and 56c the lower extremities of which are pivotally connected with carrier plates 52 by bearing means 60 (FIG. 6), respectively. The U-shaped bow member 56 is normally biased upwardly toward the vertical position illustrated in FIG. 4 by spring means 62 including a compression spring 64 that is concentrically mounted about biasing rod 66 that extends at one end through an opening contained in guide plate 52b welded to the external surface of carrier plate 52, as shown in FIGS. 4 and 6, for pivotal connection with the associated leg portion of bow member 56. The other end of the spring rod 66 reacts with an abutment 66a at the end of rod 66, as shown in FIG. 4. Similar support plate and spring means (not shown) are associated with the other leg 56c of the bow member 56. Stop members 70 integral with the carrier plates serve to limit the extent of travel of the bow member 56 by the spring biasing means 62, whereby the bow member is normally maintained in the vertical position illustrated in FIG. 4. Adjustment of the idler pulleys 26 and 28 to vary the tension of the endless drive members 18 and 20 is afforded by conventional adjustment bolt means 74. The upper cable runs are guided by pairs of guide rings 78 secured to the external surfaces of the container side walls adjacent the driving and driven pulleys, respectively.

When the crank member 36 is rotated to displace the carrier plates 52 toward the rear container-covering positions of FIG. 1, the U-shaped bow member 56 may be pivoted from its normal vertical position of FIG. 4 rearwardly and downwardly toward the generally horizontal cover-tensioning position of FIG. 1, use being made of manually operable pull lines 90 that are each secured at one end to the associated transverse portion 56a of the bow member, the pull lines being adapted to be tied at their other ends with clete members 92 fastened to the external surfaces of container side walls 2a and 2b, in the manner shown in FIG. 1.

OPERATION

In operation, assume that the cover member 10 is initially in the longitudinally-tensioned container-fully-covered condition of FIG. 1, wherein the forward edge portion 10a of the cover extends downwardly beyond the container front wall 2c, the lateral cover portions 10c and 10d extend downwardly beyond the top edges of the container side walls 2a and 2b, respectively, and the cover rear edge portion 10b extends downwardly beyond the upper edge of the container rear wall 2d. Owing to the fact that the bow member 56 is maintained by the tie lines 90 in the illustrated horizontal position, the cover member 10 is in a longitudinally tensional condition.

To uncover the container, the operator unties the tie lines 90 from the fixed cletes 92, whereupon the spring-biased bow member 56 is progressively pivoted upwardly toward the vertical position of FIG. 4 against the stop means 70, owing to the biasing force generated by compression springs 66. The operator now moves to the front of the container and operates hand crank 36 to rotate drive pulleys 22 and 24 via drive pulley 38, V-belt 40, driven pulley 34, shaft 30 and pulleys 22 and 24, whereupon the endless drive members 18 and 20 are driven at the same speed and at the same velocity to displace the carrier plates 52 on opposite sides of the container forwardly toward the front wall 2c. During this forward travel of the support plate 52—and the U-shaped bow member 56 carried thereby—the rear portion of the cover member is progressively displaced forwardly with the cover member being gathered into folds as shown in FIG. 4, thereby uncovering the top of the container.

To recover the container, the crank means 36 is rotated in the opposite direction to drive the two carrier plates 52—with the vertically arranged bow member connected therebetween—rearwardly of the container, thereby to unfold the tarp cover with the lateral edge portions of the cover extending downwardly beyond the corresponding upper edges of the container side walls, owing to the connection with the slidably mounted rings 44. When the carrier plates 52 reach their rear container-covering positions, the manual tie lines 90 are pulled down by the operator to pivot the U-shaped bow member downwardly from its vertical position (FIG. 4) toward the generally horizontal cover-tensioning position of FIG. 1, thereby applying longitudinal tension to the cover member 10 via the end tie members 58. The lower ends of the pull lines 90 are then tied to the external cletes 92, whereupon the trailer container is in condition for highway transport.

Figure 9:
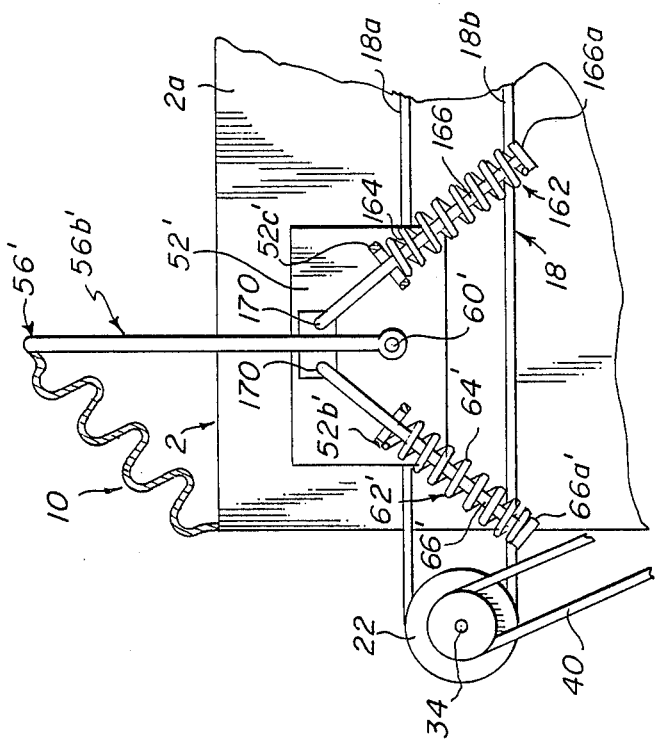

Referring now to the preferred embodiment of the invention illustrated in FIGS. 9 and 10, in order to avoid obstruction by the bow member to the container loading means when the carrier plates 52', bow 56', and the rear end of the cover member 10 are displaced forwardly to the container-uncovered position, the bow carrier means are designed to also permit forward pivotal movement of the bow member relative to the plates 52' by the pull line 90 from the vertical position of FIG. 9 toward the generally horizontal container-unobstructing retracted position of FIG. 10. In this embodiment, the stop means 70 of the first embodiment are eliminated to permit forward pivotal movement of the bow member 56' through an angle of slightly less than 180° relative to the carrier plates 52' secured to the upper runs 18a, 20a of the endless drive members 18 and 20, respectively, whereby the bow transverse portion is arranged forwardly of the container front wall. Second resilient means 162 are provided for biasing the bow member from this retracted forward position toward the normal vertical position of FIG. 9. The compression springs 64' and 164 react between the fixed guide plates 52b' and 52c' on the carrier plate 52' and the enlargements 66a' and 166a at the remote ends of the spring rods 66' and 166, respectively. The adjacent ends of the spring rods are pivotally connected with the leg portions of the bow member 56' by pivot connections 170, respectively. The remaining structure of this second embodiment corresponds with that of the first embodiment of FIGS. 1-9, the bow member 56' being rearwardly pivotable about bearings 60' when the carrier plates 52' are displaced by drive members 18 and 20 to their rear container-covered positions (not shown), thereby to longitudinally tension the cover as described above.

While in accordance with the provisions of the Patent Statutes the preferred form of the invention has been illustrated and described, it will be apparent that various other modifications may be made in the invention as described and illustrated.

What is claimed is:

1. A tarp system for covering an open-topped rectangular container having an opposed pair of side walls, and front and rear end walls, comprising:
    (a) a flexible generally rectangular tarp cover member having longitudinal and transverse dimensions slightly greater than the corresponding dimensions of the container, respectively, said cover member being adapted for horizontal arrangement to overlie the upper edges of the side and end walls of the container and thereby enclose the chamber defined therein;
    (b) means for fastening the forward end portion of said cover member with the upper end of the container front wall;
    (c) means for displacing the rear end portion of said cover member between a container-covered rear position adjacent the container rear end wall, and a container-uncovered forward position adjacent the container front end wall, said displacing means including:
        (1) a pair of endless flexible drive members mounted in opposed relation externally of said container side walls, respectively, each of said drive members having horizontal vertically-spaced upper and lower runs, said upper runs being spaced slightly below the upper edges of said side walls, respectively;
        (2) a pair of carrier plates connected in opposed relation with said drive member upper runs, respectively;
        (3) an inverted generally U-shaped bow member having a transverse portion extending transversely across the container, and a pair of leg portions pivotally connected at their free ends with said carrier plates, respectively, the rear end of said cover member being connected with said bow member transverse portion;
        (4) spring means normally biasing said bow member toward a vertical position relative to said carrier plates and said endless drive members; and
        (5) reversibly operable drive means for simultaneously driving said endless drive members to displace said carrier plates and said bow member alternately forwardly or rearwardly toward said forward and rear positions relative to said container; and
    (d) bow pivoting means operable when said plates and said bow member are in said rear position to pivot said bow member rearwardly toward a cover-tensioning position in which the cover member is longitudinally tensioned across the upper end of the container, said bow pivoting means being operable when said plates and said bow member are in said forward position for pivoting said bow member forwardly toward an unobstructing position in which said transverse portion is forwardly of the container front wall, thereby to permit filling of the container without obstruction by said bow member.

2. Apparatus as defined in claim 1, wherein said resilient means normally biasing said bow member toward the vertical position include for each bow member leg portion a pair of compression springs arranged on opposite sides of said leg portion, respectively, said springs being connected for reaction between said leg portion and the associated carrier plate, respectively.

3. Apparatus as defined in claim 1, and further including means connecting the lateral edge portions of said cover member with the upper runs of said endless drive members respectively.

4. Apparatus as defined in claim 3, wherein said lateral edge cover connecting means includes a plurality of connecting rings mounted for sliding movement on each of said endless member upper runs, respectively.

5. A tarp system for covering an open-topped rectangular container having an opposed pair of side walls, and front and rear end walls, comprising:
    (a) a flexible generally rectangular tarp cover member having longitudinal and transverse dimensions slightly greater than the corresponding dimensions of the container, respectively, said cover member being adapted for horizontal arrangement to overlie the upper edges of the side and end walls of the container and thereby enclose the chamber defined therein;
    (b) means for fastening the forward end portion of said cover member with the upper end of the container front wall;
    (c) means for displacing the rear end portion of said cover member between a container-covered rear position adjacent the container rear end wall, and a container-uncovered forward position adjacent the container front end wall, said displacing means including:
        (1) a pair of endless flexible drive members mounted in opposed relation externally of said container side walls, respectively, each of said drive members having horizontal vertically-spaced upper and lower runs, said upper runs being spaced slightly below the upper edges of said side walls, respectively;

(2) a pair of carrier plates connected in opposed relation with said drive member upper runs, respectively;

(3) an inverted generally U-shaped bow member having a transverse portion extending transversely across the container, and a pair of leg portions freely pivotally connected at their free ends with said carrier plates, respectively, the rear end of said cover member being connected with said bow member transverse portion;

(4) spring means normally biasing said bow member toward a vertical position relative to said carrier plates and said endless drive members; and (5) reversibly operable drive means for simultaneously driving said endless drive members to displace said plates and said bow member alternately forwardly or rearwardly toward said forward and rear positions relative to said container;

(d) manually operable bow pivoting means operable when said plates and said bow member are in said rear position to pivot said bow member rearwardly toward a cover-tensioning position in which the cover member is longitudinally tensioned across the upper end of the container; and (e) means connecting the longitudinal edge portions of said cover member with the adjacent upper runs of said endless drive means, respectively.

6. Apparatus as defined in claim 5, wherein said reversibly operable drive means includes means coupling together said endless drive members.

7. Apparatus as defined in claim 6, wherein said reversibly operable drive means further includes a pair of drive pulleys adjacent one end of the container and upon which said endless drive members are mounted, respectively, and further wherein said coupling means comprises a transversely-extending horizontal drive shaft adapted for rotational mounting adjacent one end of said container, said drive shaft being connected at opposite ends with said drive pulleys, respectively.

8. Apparatus as defined in claim 5, and further including stop means mounted on said carrier plates for limiting the extent of pivotal movement of said bow member by said resilient means in the direction away from said horizontal cover-tensioning position.

* * * * *